(12) United States Patent
Wind et al.

(10) Patent No.: US 10,514,128 B2
(45) Date of Patent: Dec. 24, 2019

(54) DRIVE GEAR ASSEMBLY FOR A DETACHABLE ROLL

(71) Applicant: Océ Holding B.V., Venlo (NL)

(72) Inventors: Anne A. Wind, Venlo (NL); Bart J. M. Coumans, Venlo (NL); Juan C. Perez Munoz, Venlo (NL); Joseph A. Schulkes, Venlo (NL)

(73) Assignee: OCÉ HOLDING B.V., Venlo (NL)

(*) Notice: Subject to any disclaimer, the term of this patent is extended or adjusted under 35 U.S.C. 154(b) by 149 days.

(21) Appl. No.: 15/848,894

(22) Filed: Dec. 20, 2017

(65) Prior Publication Data

US 2018/0187833 A1    Jul. 5, 2018

(30) Foreign Application Priority Data

Jan. 4, 2017   (EP) .................................... 17150247

(51) Int. Cl.
*F16P 3/08*   (2006.01)
*F16H 1/06*   (2006.01)
(Continued)

(52) U.S. Cl.
CPC .................. *F16P 3/08* (2013.01); *B41J 15/04* (2013.01); *B41J 29/13* (2013.01); *B65H 16/06* (2013.01);
(Continued)

(58) Field of Classification Search
CPC .... F16P 3/00; F16P 3/001; F16P 3/003; F16P 3/005; F16P 3/08; F16P 3/10; F16P 3/125;
(Continued)

(56) References Cited

U.S. PATENT DOCUMENTS

| | | | | | |
|---|---|---|---|---|---|
| 4,234,136 A | * | 11/1980 | Wenzel | .................. | B65H 16/06 |
| | | | | | 242/598.1 |
| 4,669,628 A | * | 6/1987 | Hatta | ....................... | B01J 3/002 |
| | | | | | 220/211 |

(Continued)

FOREIGN PATENT DOCUMENTS

| JP | | 61279573 A | * | 12/1986 | .............. B41J 29/13 |
|---|---|---|---|---|---|
| JP | | 2004-291395 A | | 10/2004 | |

OTHER PUBLICATIONS

European Search Report issued in EP 17 15 0247, dated Jun. 16, 2017.

*Primary Examiner* — Prasad V Gokhale
(74) *Attorney, Agent, or Firm* — Birch, Stewart, Kolasch & Birch, LLP

(57) ABSTRACT

A drive gear assembly for a roll that is detachably supported in a machine body, the assembly comprising a drive gear mounted for a rotation about a stationary axis in the machine body, a driven gear mounted on an end portion of the roller, and a bearing formed in the machine body for supporting said end portion in an operative position in which the drive gear meshes with the driven gear, the assembly further comprising by a safety cover that is pivotally supported on the machine body to be movable between an active position in which it covers at least a part of the periphery of the driven gear, except a portion where the drive gear meshes with the driven gear, and an open position in which it permits an insertion of the end portion of the roll into the bearing, the cover being elastically biased into the open position and having an engagement surface arranged to be engaged by at least one of the roll and the driven gear for holding the cover in the active position as long as the roll is in the operative position.

10 Claims, 4 Drawing Sheets

(51) Int. Cl.

| | |
|---|---|
| *B65H 16/10* | (2006.01) |
| *B65H 16/06* | (2006.01) |
| *B65H 19/12* | (2006.01) |
| *B41J 15/04* | (2006.01) |
| *B41J 29/13* | (2006.01) |
| *B65H 26/00* | (2006.01) |

(52) U.S. Cl.
CPC ......... *B65H 16/103* (2013.01); *B65H 19/126* (2013.01); *B65H 26/00* (2013.01); *F16H 1/06* (2013.01); *B65H 2301/413665* (2013.01); *B65H 2407/10* (2013.01); *B65H 2801/12* (2013.01)

(58) Field of Classification Search
CPC . B41J 15/04; B41J 29/12; B41J 29/13; B65H 16/06; B65H 19/126; B65H 26/00; B65H 54/72; B65H 75/141; B65H 2301/413665; B65H 2407/10
See application file for complete search history.

(56) References Cited

U.S. PATENT DOCUMENTS

| | | | | |
|---|---|---|---|---|
| 4,905,632 | A | * | 3/1990 | Nigawara ................. F16P 3/08 110/193 |
| 2003/0098382 | A1 | * | 5/2003 | Gangemi ............... B65H 26/00 242/534 |
| 2009/0272838 | A1 | | 11/2009 | Kaminaka |
| 2011/0076083 | A1 | | 3/2011 | Tsurui et al. |
| 2011/0206439 | A1 | | 8/2011 | Takahashi |
| 2012/0012634 | A1 | | 1/2012 | Hatada et al. |
| 2012/0195670 | A1 | | 8/2012 | Lawniczak |
| 2019/0118566 | A1 | * | 4/2019 | Mori ....................... B41J 2/325 |

* cited by examiner

DRIVE GEAR ASSEMBLY FOR A DETACHABLE ROLL

BACKGROUND OF THE INVENTION

1. Field of the Invention

The invention relates to a drive gear assembly for a roll that is detachably supported in a machine body, the assembly comprising a drive gear mounted for rotation about a stationary axis in the machine body, a driven gear mounted on an end portion of the roll, and a bearing formed in the machine body for supporting said end portion in an operative position in which the drive gear meshes with the driven gear.

More particularly the invention relates to a drive gear assembly for a media roll in a printing system.

2. Description of Background Art

In many printing systems the print media are supplied in the form of and endless web that is withdrawn from a roll. The roll has a tubular core carrying a coil of the print media web. At least one end of the core is closed off by a plug that carries the driven gear. In the operative position, the driven gear may be driven for rotation by means of the drive gear, and since the end plug is firmly secured to the core or is at least in frictional engagement with the core, the entire roll will be rotated so that the print media web is paid out from the roll.

When the print media coil is depleted, the roll will be detached and removed, and a new roll with a new supply of print media will be mounted in its place. When the new roll is manually inserted in the machine by an operator, the operator will try to avoid to touch the print media web with his hands, and he will therefore grip the roll at the end plugs, so that at least one hand will be in immediate vicinity of the driven gear. The toothed periphery of the driven gear will be exposed to the outside at least to the extent that the driven gear can mesh wish the drive gear. It is therefore desirable to protect the operator against direct contact with the toothed periphery of the driven gear at least during the time when the roll is being rotated.

It is an object of the invention to provide a drive gear assembly which can be operated safely and nevertheless permits an easy replacement of the roll.

In order to achieve this object, the drive gear assembly according to the invention is characterized by a safety cover that is pivotally supported on the machine body to be movable between an active position in which it covers at least a part of the periphery of the driven gear, except a portion where the drive gear meshes with the driven gear, and an open position in which it permits an insertion of the end portion of the roll into the bearing, the cover being elastically biased into the open position and having an engagement surface arranged to be engaged by at least one of the roll and the driven gear for holding the cover in the active position as long as the roll is in the operative position.

Thus, when the roll is in the operative position and the driven gear meshes with the drive gear, the toothed periphery of the driven gear will be shielded against direct contact by the safety cover. When the machine has been stopped and the roll is removed manually, the part of the roll and/or the driven gear which has been in engagement with the engagement surface of the cover will be lifted off from this engagement surface, so that the cover will automatically pivot into the open position in which it does no longer interfere with the driven gear when the roll is removed. Since the cover is biased into the open position, it will remain in the open position until a new roll is mounted. Then, as soon as the new roll comes into contact with the engagement surface of the cover, the cover will flip back into the active position, so that the toothed periphery of the driven gear is shielded again.

More specific optional features and further developments of the invention are indicated in the dependent claims.

In a preferred embodiment, a switch is provided for detecting the active or open position of the cover and for preventing the drive gear from being driven as long as the cover is not in the active position.

The cover may be pivotable about an axis that extends normal to the axis of rotation of the driven gear in the operative position but is offset from that axis of rotation.

The bearing may comprise two ore more rollers which engage the peripheral surface of the end plug or the core of the roll and are supported in resilient bearing structures, so that the bearing rollers may retreat when the roll is being inserted into or removed from the bearing.

Further, the bearing may comprise one ore more axial bearing rollers which are disposed in positions offset from the axis of rotation of the roll and the driven gear and are biased against an end face of the driven gear so as to control the axial position of the roll and the driven gear. These axial bearing rollers are oriented in circumferential direction of the driven gear so that they will roll over the end face of the driven gear when the latter rotates.

Similarly, the engagement surface of the safety cover may comprise a roller which reduces friction between the driven gear and the safety cover.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
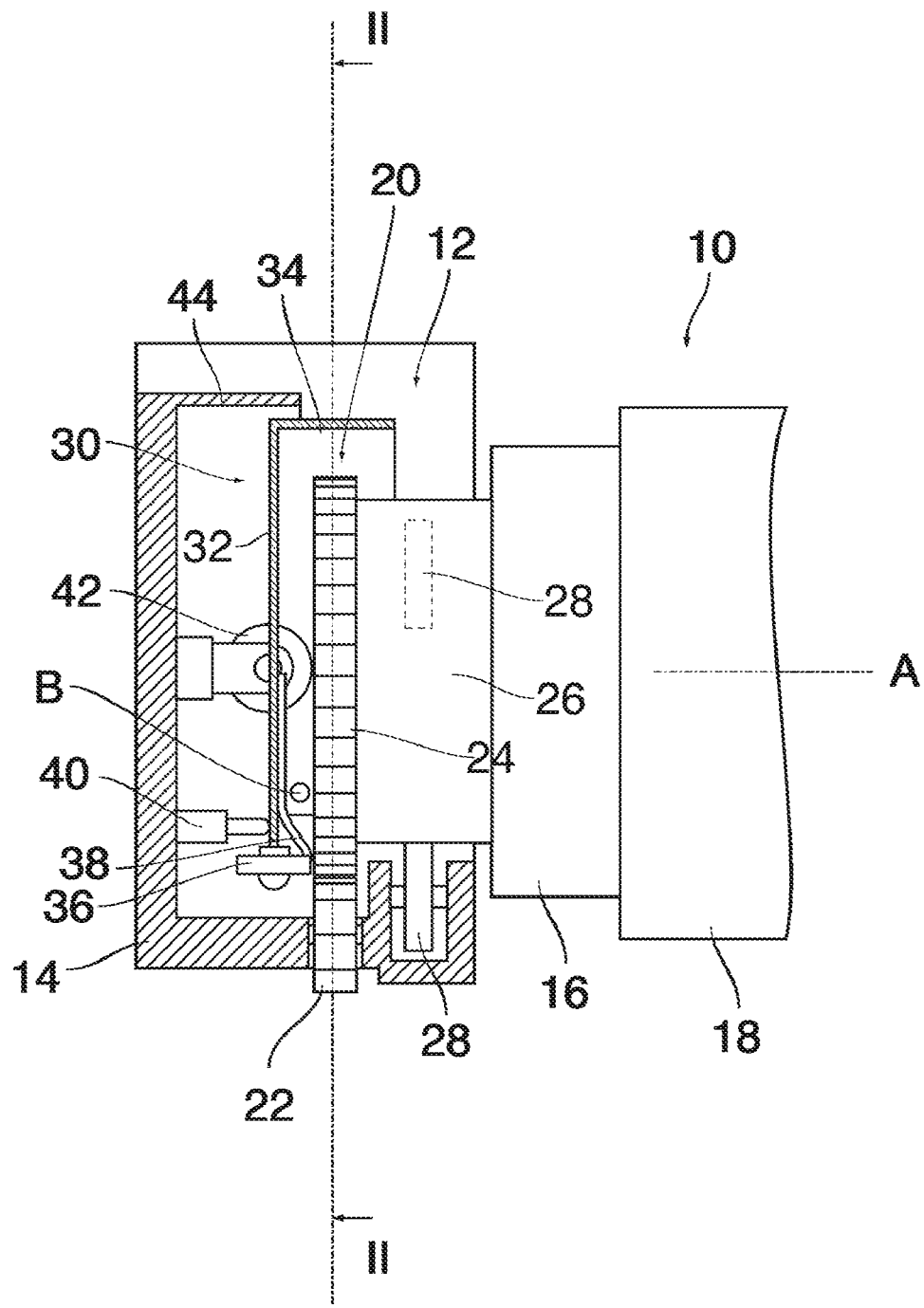
FIG. 1 is a view of an end portion of a roll and, in an axial section, a bearing for the roll, including a drive gear assembly according to the invention.

The present invention will now be described with reference to the accompanying drawings, wherein the same reference numerals have been used to identify the same or similar elements throughout the several views.

As is shown in FIG. 1, an end portion of a roll 10 is rotatably supported in a bearing 12 of a machine body 14.

By way of example, the machine body 14 may be a body of a printer, and the roll 10 may be a media roll having a tubular core 16 made of cardboard. An endless web of print media 18 is wound on the core 16 and forms a coil 18. When the print media web is to be supplied to a print engine of the printer, the roll 10 is driven for rotation so that the web is unwound from the coil 18.

The bearing 12 accommodates a drive gear assembly 20 which has the purpose to rotate the roll 10. The drive gear assembly 20 comprises a drive gear 22 which is driven for rotation by a drive train that has not been shown here. The drive gear 22 meshes with a driven gear 24 that is carried on an end of a cylindrical plug 26 that has been inserted into and attached to the tubular core 16.

The bearing 12 further comprises three radial bearing rollers 28 disposed around the periphery of the plug 26. The roll 10 has an axis of rotation A, and two of the radial bearing rollers 28 (shown in phantom lines in FIG. 1) are arranged before and behind the plane of the drawing in FIG. 2 and on a side of the axis A opposite to the drive gear 22 and the third radial bearing roller. All three radial bearing rollers 28 engage the peripheral surface of the plug 26. The two radial bearing rollers arranged remote of the drive gear 22 are resiliently supported on the machine body 14 and are elastically biased radially inwardly with respect to the axis A, so that the plug is urged against the third radial bearing roller and the driven gear 24 is urged into meshing engagement with the drive gear 22.

The bearing 12 further accommodates a safety cover 30 which is provided for preventing hands or other parts of a human body from coming into contact with the toothed periphery of the driven gear 24, especially in a state in which the roll 10 is driven. The cover 30 has a bottom wall 32 which extends in parallel with an outer end face of the driven gear 24, and a part-cylindrical skirt 34 which straddles and covers the outer periphery of the driven gear 24 at least on the side opposite to the drive gear 22.

The cover 30 is pivotally supported in the bearing 12 so as to be pivotable about an axis B which is orthogonal to the axis of rotation A of the roller 10 but is offset from the axis A towards the side of the drive gear 22. The cover is biased in counter-clock sense in FIG. 1 but is held in the position shown in FIG. 1 by first and second engagement surfaces 36, 38 which engage the outer end face of the driven gear 24. The first engagement surface 36 is constituted by a peripheral surface of a roller which is rotatably supported in the bottom wall 32 of the cover and is oriented in circumferential direction of the driven gear 24 so that it can roll over the end face of the gear 24 when this gear rotates. The second engagement surface 38 is constituted by a ramp that rises from the bottom wall 32 to the point where the first engagement surface 36 contacts the driven gear 24.

In the position shown in FIG. 1, the bottom wall 32 of the cover engages a switch 40 and holds the switch closed, so that the drive train for the drive gear 22 may be powered.

The bearing 12 further accommodates two axial bearing rollers 42 which are disposed in symmetric positions offset from the axis of rotation A and are elastically biased against the end face of the driven gear 24 and oriented in circumferential direction of that gear, so that they roll over the end face, when the driven gear 24 rotates.

The opposite end of the roll 10 which is not shown in FIG. 1 may be supported in the machine body 14 in another bearing which has the same construction as the bearing 12 but does not need to have the drive gear assembly 20 and the safety cover 30. The axial bearing rollers of that other bearing may be supported rigidly on the machine body 14, so that the roll 10 is held in a well-defined axial position when an end face of a counterpart of the plug 26 engages these rollers. The elastically biased rollers 42 shown in FIG. 1 will then urge the entire roll 10 into the position defined by the bearing rollers on the other side.

As is further shown in FIG. 1, the part of the machine body 14 that forms the bearing 12 has a peripheral wall 44 that surrounds the safety cover 30 but terminates shortly before the outer end face of the driven gear 24.

Figure 2:
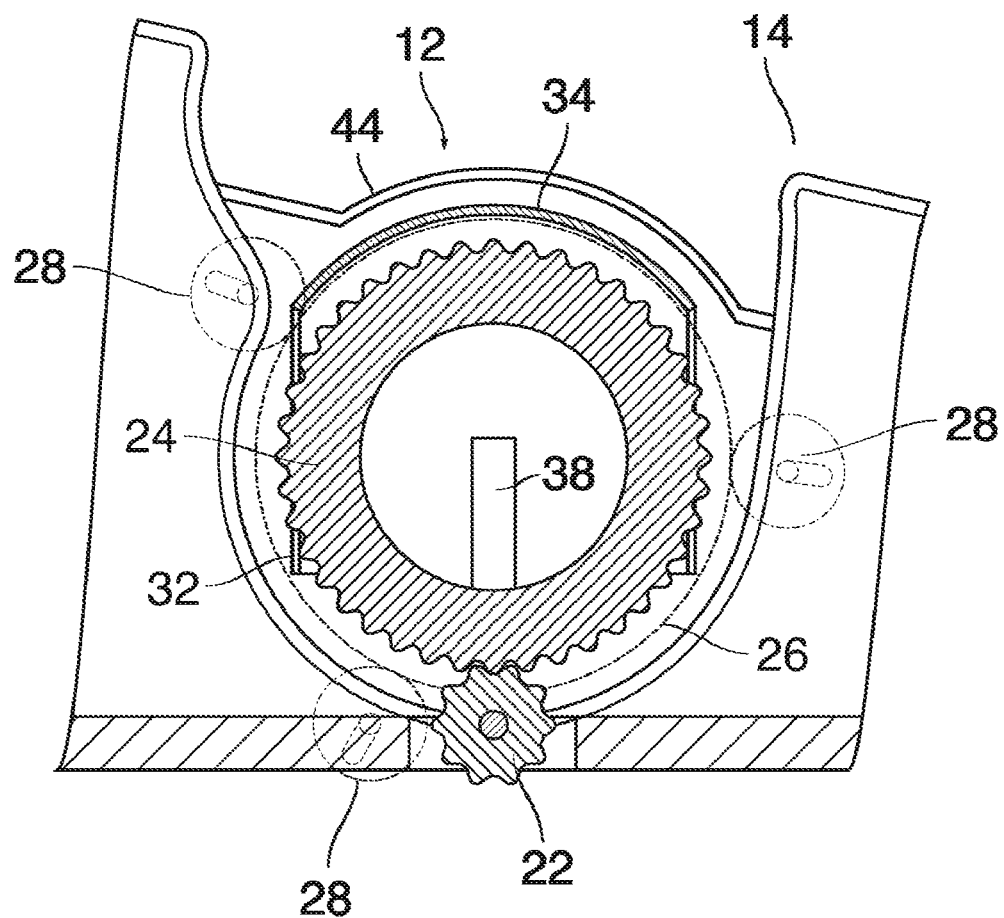
FIG. 2 is a sectional view taken along the line II-II in FIG. 1.

FIG. 2 is a cross-sectional view of the bearing 12, with the drive gear 22, the driven gear 24 and the skirt 34 being shown in cross-section. The outer periphery of the plug 26 and the radial bearing rollers 28 are not visible but have been shown in phantom lines.

Figure 3:
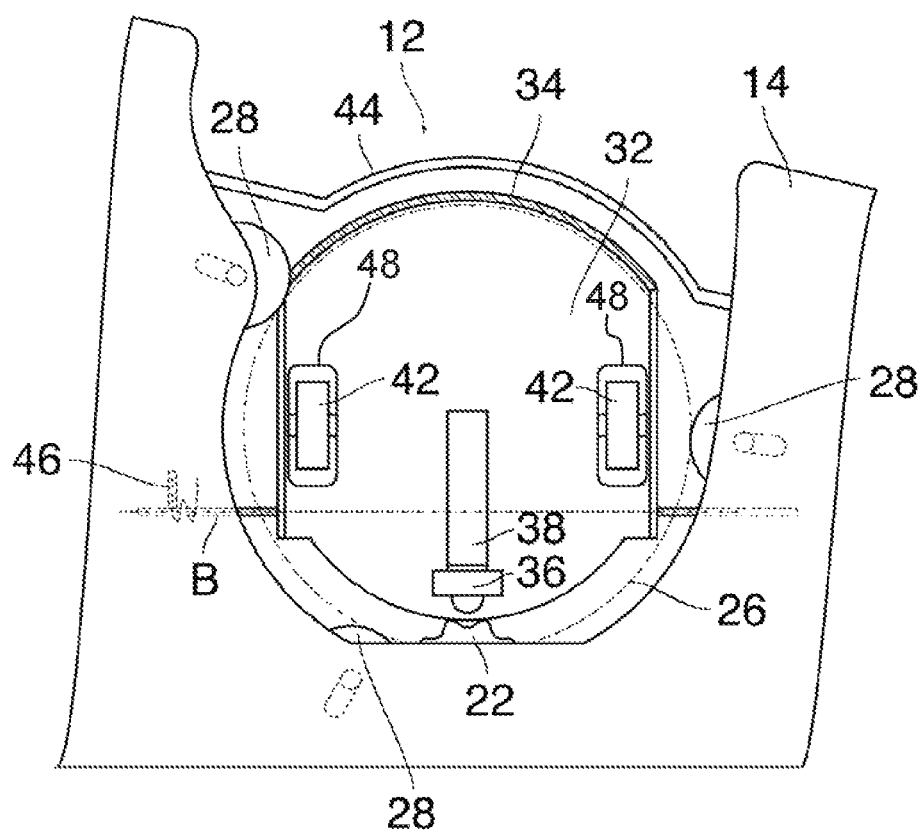
FIG. 3 is a view of the bearing as seen in the same direction as in FIG. 2, but without the roll.

In FIG. 3, the bearing 12 has been shown without the roll 10 and the driven gear 24. The axial bearing rollers 42 are visible in windows 48 formed in the bottom wall 32 of the safety cover.

FIG. 3 also shows a coil spring 46 acting upon the axis B of the safety cover 30 for biasing the same in counter-clock sense in FIG. 1.

Figure 4:
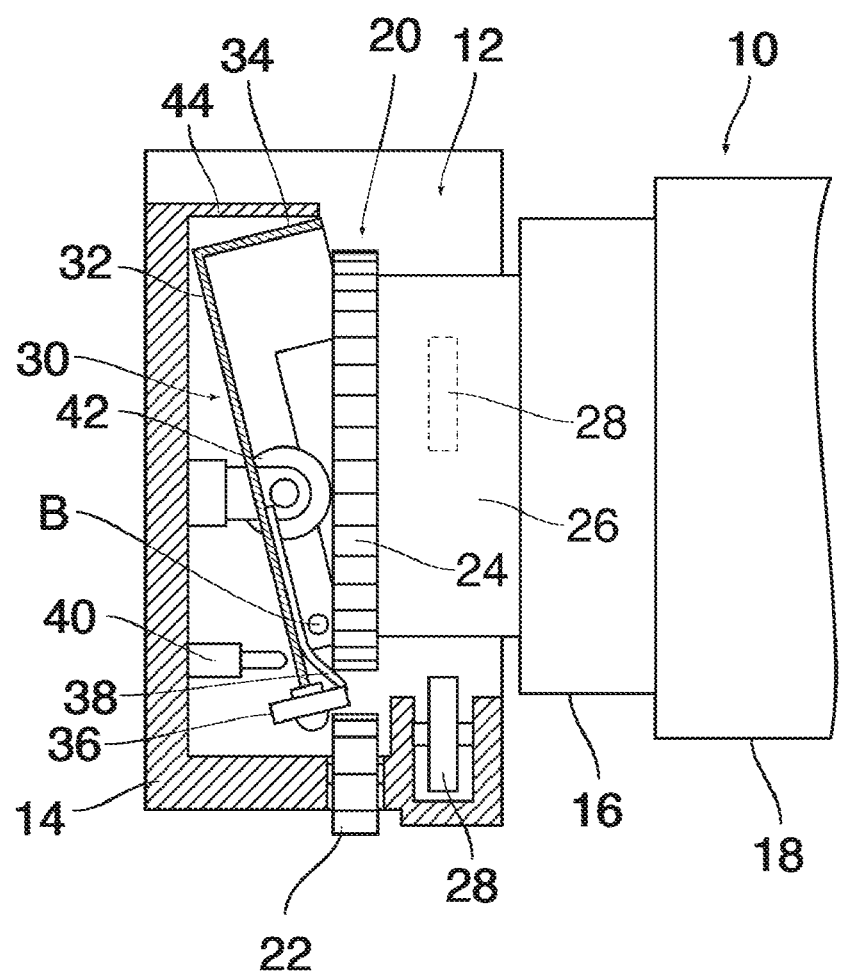
FIG. 4 is a view analogous to FIG. 1 but showing a situation where the roll is removed from the bearing.

In FIG. 4, the drive gear 22 is not driven, and the roller 10 has been slightly lifted out of the bearing 12 together with the plug 26 and the driven gear 24. As a result, the driven gear 24 does no longer mesh with the drive gear 22, and the lower rim of the driven gear 24 retreats from the engagement surfaces 36, 38 of the cover 30. As a result, the cover 30 has pivoted into the position shown in FIG. 4 under the bias of the coil spring 46. This permits to lift the roll 10 and the driven gear 24 further and to fully remove them from the bearing 12.

Further, as is shown in FIG. 4, the bottom wall 32 of the cover ceases to engage the switch 40, so that the switch is in an open state, preventing the drive gear 22 from being driven again.

When a new roll 10 is to be mounted, it is inserted into the bearing 12 from above. As soon as the lower rim of the driven gear 24 hits the ramp-shaped second engagement surface 38, the safety cover 30 is pivoted clock-wise in FIG. 4 against the bias of the coil spring 46 into the position shown in FIG. 1, so that the toothed peripheral edge of the driven gear 24 is protected again by the skirt 34.

The pivotal movement of the cover 30 also actuates the switch 40 and turns the switch on again, so that the drive train for the drive gear 22 can be activated again.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e.

non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A drive gear assembly for a roll that is detachably supported in a machine body, the assembly comprising:
   a drive gear mounted for rotation about a stationary axis in the machine body;
   a driven gear mounted on an end portion of the roll;
   a bearing formed in the machine body for supporting said end portion in an operative position in which the drive gear meshes with the driven gear; and
   a safety cover that is pivotally supported on the machine body to be movable between an active position in which the safety cover covers at least a part of the periphery of the driven gear, except a portion where the drive gear meshes with the driven gear, and an open position in which the safety cover permits an insertion of the end portion of the roll into the bearing,
   wherein the cover is elastically biased into the open position and has an engagement surface arranged to be engaged by at least one of the roll and the driven gear for holding the cover in the active position as long as the roll is in the operative position.

2. The assembly according to claim 1, comprising a switch arranged to detect a state in which the safety cover is not in the active position and arranged to prevent drive power from being supplied to the drive gear when this state is detected.

3. The assembly according to claim 1, wherein the safety cover is pivotable about an axis which is orthogonal to but offset from an axis of a rotation of the roll.

4. The assembly according to claim 3, wherein the safety cover has a skirt straddling the periphery of the driven gear at least on a side opposite to a pivotal axis for the safety cover.

5. The assembly according to claim 4, wherein the safety cover has a bottom wall which is parallel to an end face of the driven gear when the cover is in the active position, the engagement surface being formed on the bottom wall.

6. The assembly according to claim 5, wherein the engagement surface comprises an outer peripheral surface of a roller that is rotatably supported on the cover in a position offset from the axis of rotation of the roll and is oriented for rolling in a circumferential direction of the driven gear so as to roll over the end face of the driven gear when a driven gear rotates.

7. The assembly according to claim 5, wherein the engagement surface comprises a ramp surface which rises from the bottom wall of the cover towards the end face of the driven gear.

8. The assembly according to claim 5, comprising at least two axial bearing rollers disposed in positions offset from the axis of rotation of the roll and arranged to engage the end face of the driven gear and oriented for rolling in a circumferential direction of the driven gear, and wherein the axial bearing rollers project towards the end face of the driven gear through windows formed in the bottom wall of the cover.

9. The assembly according to claim 1, wherein the roll has a portion with a cylindrical peripheral surface adjacent to the driven gear, and the bearing comprises at least two radial bearing rollers arranged to engage the peripheral surface of said portion and biased towards an axis of rotation of the roll.

10. The assembly according to claim 1, comprising at least two axial bearing rollers disposed in positions offset from an axis of rotation of the roll and arranged to engage an end face of the driven gear and oriented for rolling in a circumferential direction of the driven gear.

* * * * *